UNITED STATES PATENT OFFICE.

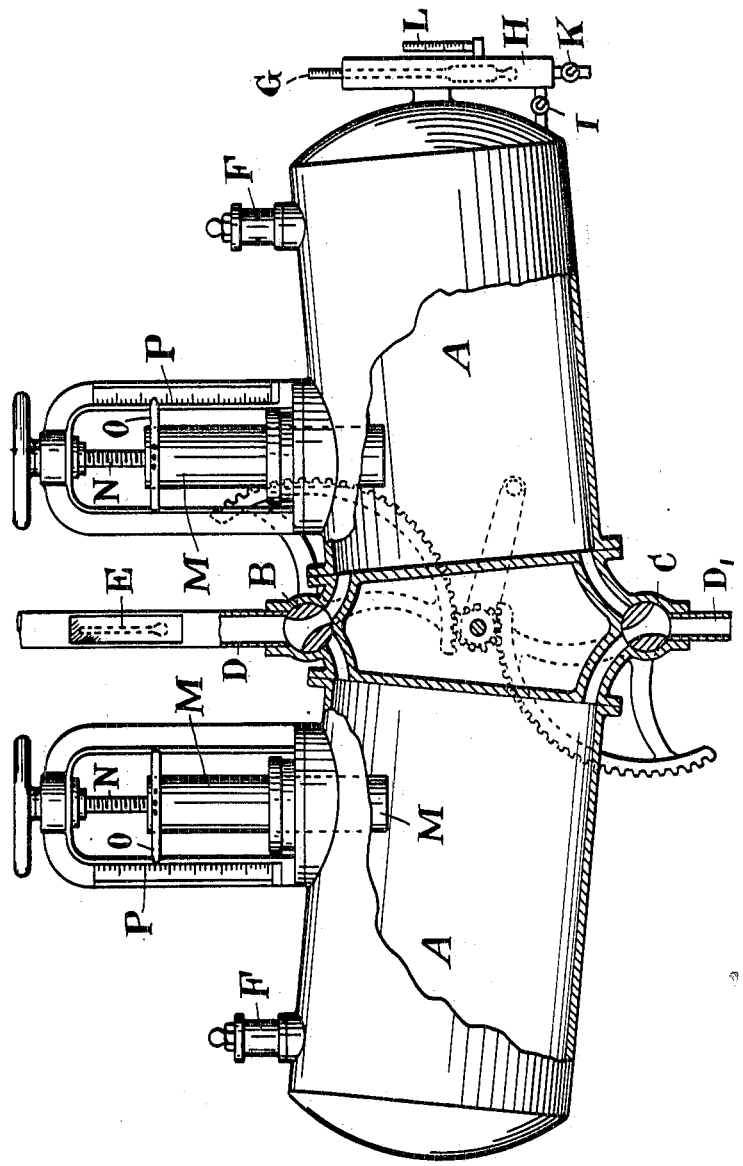

OSVALDUS VALDEMAR KJÖGX, OF BERGEN, NORWAY.

LIQUID-MEASURING APPARATUS.

1,287,340.　　　　　Specification of Letters Patent.　　Patented Dec. 10, 1918.

Application filed December 6, 1916.　Serial No. 135,372.

*To all whom it may concern:*

Be it known that I, OSVALDUS VALDEMAR KJÖGX, a subject of the King of Denmark, residing at Bergen, Norway, have invented certain new and useful Improvements in Liquid-Measuring Apparatus; and I do hereby declare the following to be a full, clear, and exact description of the invention, such as will enable others skilled in the art to make and use the same, reference being had to the accompanying drawings, and to letters or figures of reference marked thereon, which form a part of this specification.

My invention relates to means for measuring liquids and more especially for measuring liquids, the nature of which is such that the value of a certain volume varies according to the temperature and according to the varying quality or grade of the liquid. Such liquids are for instance petroleum, benzin, etc.

It is usual at present, at the sale of such liquids in larger quantities first to weigh the cask or barrel, then fill it with liquid, then weigh it again and thereupon marking the barrel giving both the gross and the net weights. This procedure is very bothersome and takes much time. This system is therefore expensive and causes mistakes.

The object of this invention is to provide an apparatus by means of which it is possible to sell such liquids in barrels or other containers holding quantities of equal value, so that any weighing, calculating or marking becomes superfluous.

As however, as above mentioned, such liquids vary very much as to specific gravity both on account of varying temperature and on account of varying grade, the volume of liquid measured for sale must vary in proportion. My invention therefore relates to means whereby it is made possible during the delivery operation to regulate the volume of the measuring vessel through which the liquid passes, so that according to the temperature and to the grade of the liquid a varying quantity (by volume) of liquid is delivered to the different barrels.

To this end my invention consists in the combination with a closed measuring vessel of means to regulate the volume of the same and a hydrometer, and in the following I shall describe one manner of carrying out my invention, references being had to the accompanying drawing, which is a lateral view, partially in section of a measuring apparatus.

In the drawing A, A represent two measuring vessels. At the top and bottom these vessels by means of three-way-cocks B, C connect with a supply pipe D and an outlet D' respectively. These cocks may be so connected with each other that while the top cock connects one measuring vessel with the supply pipe, the other one connects the other measuring vessel with the outlet and vice versa. E represents a thermometer mounted inside the supply pipe behind a window. F are air valves of any known design.

On one of the measuring vessels a hydrometer G is arranged, it being placed in a tube H communicating with the vessel through a cock I and being provided with a bottom cock K. By means of these cocks the tube from time to time can easily be emptied and filled anew from the measuring vessel. L is a thermometer by means of which the operator may observe the temperature in the hydrometer tube, which of course always should be the same as the temperature that the thermometer E in the supply pipe shows.

M is a piston, the position of which by means of the screw spindle N may be regulated, thereby adjusting the volume of the measuring vessel. The piston carries a pointer O which indicates the position of the piston on a scale P. The scale P is indexed in accordance with the scale of the hydrometer, so that when the operator places the piston pointer on the same index number as the one given by the hydrometer the volume of the measuring vessel will be regulated to suit the grade and the temperature of the liquid just passing through the measuring apparatus.

There being two measuring vessels the apparatus may be worked very quickly, one vessel being filled from the supply pipe while the other is emptied into a barrel.

I claim:

1. In a liquid measuring apparatus in combination, a closed measuring vessel having inlet and outlet connections, means to regulate the exact volume of the measuring vessel, an indicator showing the position of said regulating means, a hydrometer for indicating the specific gravity of the liquid passed through the measuring vessel, the hydrometer and the volume indicator having their scales so arranged that, when the volume regulator is adjusted so that its indicator points on a mark which conforms with the showing of the hydrometer, the volume of the measuring vessel is regulated in accordance with the specific gravity of the liquid.

2. A measuring device for dispensing different grades of a definite kind of material comprising a container, a sampler and means for varying the volume of the container according to the quality of the material as determined by the sampler.

In testimony that I claim the foregoing as my invention, I have signed my name in presence of two subscribing witnesses.

OSVALDUS VALDEMAR KJÖGX.

Witnesses:
C. VARMAN,
C. FABRICIUS HANSEN.